US007043549B2

(12) United States Patent
Breese et al.

(10) Patent No.: US 7,043,549 B2
(45) Date of Patent: *May 9, 2006

(54) METHOD AND SYSTEM FOR PROBING IN A NETWORK ENVIRONMENT

(75) Inventors: Stephen S. Breese, Morrisville, NC (US); Stig Arne Olsson, Apex, NC (US); Geetha Vijayan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 642 days.

This patent is subject to a terminal disclaimer.

(21) Appl. No.: 10/062,329

(22) Filed: Jan. 31, 2002

(65) Prior Publication Data

US 2003/0145079 A1    Jul. 31, 2003

(51) Int. Cl.
*G06F 15/173* (2006.01)
(52) U.S. Cl. .................................. 709/224; 719/332
(58) Field of Classification Search .............. 709/224, 709/226, 202, 235; 714/48, 39; 719/331, 719/332; 707/10; 340/551; 370/252; 702/27, 702/66
See application file for complete search history.

(56) References Cited

U.S. PATENT DOCUMENTS

| 5,459,837 | A | * | 10/1995 | Caccavale | ................... | 709/226 |
|---|---|---|---|---|---|---|
| 5,742,819 | A | | 4/1998 | Caccavale | | |
| 5,787,254 | A | | 7/1998 | Maddalozzo, Jr. et al. | | |
| 5,793,753 | A | | 8/1998 | Hershey et al. | | |
| 5,812,780 | A | | 9/1998 | Chen et al. | | |
| 5,872,973 | A | * | 2/1999 | Mitchell et al. | ............ | 719/332 |
| 6,000,045 | A | | 12/1999 | Lewis | | |
| 6,041,352 | A | * | 3/2000 | Burdick et al. | ............. | 709/224 |
| 6,052,733 | A | * | 4/2000 | Mahalingam et al. | ....... | 709/235 |
| 6,055,493 | A | | 4/2000 | Ries et al. | | |
| 6,070,190 | A | * | 5/2000 | Reps et al. | ................. | 709/224 |
| 6,078,956 | A | | 6/2000 | Bryant et al. | | |
| 6,108,700 | A | | 8/2000 | Maccabee et al. | | |
| 6,141,699 | A | * | 10/2000 | Luzzi et al. | ................. | 719/331 |
| 6,151,688 | A | * | 11/2000 | Wipfel et al. | ................. | 714/48 |
| 6,175,832 | B1 | * | 1/2001 | Luzzi et al. | .................. | 707/10 |
| 6,177,886 | B1 | | 1/2001 | Billington et al. | | |
| 6,278,694 | B1 | | 8/2001 | Wolf et al. | | |
| 6,278,966 | B1 | | 8/2001 | Howard et al. | | |
| 6,327,550 | B1 | | 12/2001 | Vinberg et al. | | |
| 6,356,205 | B1 | | 3/2002 | Salvo et al. | | |
| 6,401,119 | B1 | | 6/2002 | Fuss et al. | | |
| 6,425,006 | B1 | | 7/2002 | Chari et al. | | |

(Continued)

OTHER PUBLICATIONS

Synchronizing Network Probes to avoid Mesurement . . . —Gaidioz, Wolski . . . (2000) www.cs.utk.edu/~rich/publications/nws-period.ps.gz.*

(Continued)

*Primary Examiner*—Thong Vu
(74) *Attorney, Agent, or Firm*—Stephen J. Walder, Jr.; David A. Mims, Jr.

(57) ABSTRACT

An example of a solution provided here comprises: providing a script; employing a plurality of probes, including at least one local probe and at least one remote probe; and measuring a client-server application's performance, with said probes, according to said script. For example, the following are provided: methods for probing client-server applications in a network environment, systems for executing such methods, and instructions on a computer-usable medium, for executing such methods.

46 Claims, 5 Drawing Sheets

U.S. PATENT DOCUMENTS

| | | | |
|---|---|---|---|
| 6,430,712 B1 | 8/2002 | Lewis | |
| 6,449,739 B1 | 9/2002 | Landan | |
| 6,457,143 B1* | 9/2002 | Yue | 714/43 |
| 6,587,878 B1* | 7/2003 | Merriam | 709/224 |
| 6,732,168 B1 | 5/2004 | Bearden et al. | |
| 6,763,380 B1 | 7/2004 | Mayton et al. | |
| 6,765,864 B1 | 7/2004 | Natarajan et al. | |
| 6,766,368 B1 | 7/2004 | Jakobson et al. | |
| 6,779,032 B1* | 8/2004 | Hericourt | 709/226 |
| 6,792,455 B1 | 9/2004 | DeLuca et al. | |
| 6,807,156 B1 | 10/2004 | Veres et al. | |
| 6,832,341 B1 | 12/2004 | Vijayan | |
| 6,853,619 B1* | 2/2005 | Grenot | 370/232 |
| 6,857,020 B1 | 2/2005 | Chaar et al. | |
| 6,871,324 B1 | 3/2005 | Hand et al. | |
| 6,885,302 B1* | 4/2005 | Seal et al. | 340/551 |
| 6,889,222 B1 | 5/2005 | Zhao | |
| 6,892,235 B1* | 5/2005 | Daude et al. | 709/224 |
| 6,901,442 B1 | 5/2005 | Schwaller et al. | |
| 6,904,458 B1 | 6/2005 | Bishop et al. | |
| 6,928,471 B1 | 8/2005 | Pabari et al. | |
| 6,934,745 B1 | 8/2005 | Krautkremer | |
| 6,944,673 B1 | 9/2005 | Malan et al. | |
| 2002/0004828 A1 | 1/2002 | Davis et al. | |
| 2002/0073195 A1 | 6/2002 | Hellerstein et al. | |
| 2002/0087882 A1 | 7/2002 | Schneier et al. | |
| 2002/0097267 A1* | 7/2002 | Dinan et al. | 345/757 |
| 2002/0161875 A1 | 10/2002 | Raymond | |
| 2003/0061232 A1 | 3/2003 | Patterson | |
| 2003/0093460 A1* | 5/2003 | Kinney et al. | 709/202 |
| 2003/0145079 A1 | 7/2003 | Breese et al. | |
| 2003/0145080 A1* | 7/2003 | Breese et al. | 709/224 |
| 2003/0167406 A1 | 9/2003 | Beavers | |
| 2004/0064546 A1* | 4/2004 | Olsson et al. | 709/224 |
| 2004/0078684 A1 | 4/2004 | Friedman et al. | |
| 2004/0205184 A1* | 10/2004 | Olsson et al. | 709/224 |

OTHER PUBLICATIONS

Application-Level Measurements of Performance on the vBNS—Clark, Jeffay (1999) www.cs.unc.edu/~jeffay/papers/ICMCS-99.ps.*

A High Performance Network Intrusion Detection System—Sekar, Guang, Verma, Shanbhag (1999) seclab.cs.sunysb.edu/sekar/papers/ccs99.ps.*

A State Management Protocol for IntServ, DiffServ and ... —Adiseshu, Parulkar ... (1998) www.ccrc.wustl.edu/~hari/icnp.ps.*

An Architecture for Large-Scale Internet Measurement—Paxson, Mahdavi, Adams, Mathis (1998) ftp.ee.lbl.gov/papers/nimi-ieee-comm98.ps.gz.*

The FERET Evaluation Methodology for Face-Recognition ... —Phillips, Moon, Rizvi ... (1999) sequoyah.ncsl.nist.gov/pub/nist_internal_reports/ir_6264.ps.Z.*

The Haptic Display of Complex Graphical Environments—Ruspini, Kolarov, Khatib (1997) robotics.stanford.edu/people/krasi/Siggraph97.ps.Z.*

User-Level Billing and Accounting in IP Networks—Blott, Martin, Breitbart ... (1999) www.bell-labs.com/user/blott/BLTJ00.pdf.*

An Empirical Evaluation of Client-side Server Selection ... —Dykes, Robbins, Jeffery (2000) www.ieee-infocom.org/2000/papers/700.pdf.*

NetSTAT: A Network-based Intrusion Detection Approach—Vigna (1998) www.cs.ucsb.edu/~vigna/pub/vigna_kemmerer_acsac98.ps.gz.*

TCP Trunking for Bandwidth Management of Aggregate Traffic—Kung, Wang (2000) www.eecs.harvard.edu/~htk/publication/2000-kung-wang-tcp-trunking-1100.pdf.*

An Architecture for Monitoring, Visualization and ... —Parulkar ... (1997) www.cs.wustl.edu/~schmidt/PDF/NMVC.pdf.*

Mercury Interactive Corporation, "Products and Services/Testing," web page available at www.mercuryinteractive.com, 2001.

Mercury Interactive Corporation, "Load Testing Monitors," web page available at www.mercuryinteractive.com, 2001.

Mercury Interactive Corporation, "QuickTest Professional" data sheet available at www.mercuryinteractive.com, 2001.

Atesto Technologies Inc, "How does FunctionChecker work?" web page available athttp://www.atesto.com/solutions_func_test_how_it_works.asp , 2001.

Atesto Technologies Inc, "Functional and Regression Testing," web page available at http://www.atesto.com/solutions_automated_fun_test.asp , 2001.

Freshwater Software, "SiteSeer Example Reports," http://www.freshwatersoftware.com/SiteSeerReports.htm, 2001.

Reading Management Reports, web page available at http://demo.freshwater.com/SiteScope/docs/History.htm, 2001.

Holistix, "Holistix Web Manager," web page available at http://www.holistix.net/products/webmgr/. 2001.

Holistix, "Holistix Web Manager Reporting," web page available at http://www.holistix.net/products/webmgr/reporting.html, 2001.

Holistix, Response time and performance thresholds, web page available at http://www.holistix.net/products/webmgr/url_response_time_chart.html, 2001.

Holistix, "Correlating response time to site availability," web page available at http://www.holistix.net/products/webmgr/avail_by_monitor.html. 2001.

Keynote, "Test Perspective," web page available at http://www.keynote.com/solutions/html/test_works.html., 2001.

Keynote, "The Keynote Solution," web page available at http://www.keynote.com/solutions/html/resource_transaction_perspecti.html. 2001.

Tweney, "The Need for Speed," *Business 2.0*, vol. 2, No. 7, Aug./Sep. 2001, pp. 144-145.

* cited by examiner

METHOD AND SYSTEM FOR PROBING IN A NETWORK ENVIRONMENT

CROSS-REFERENCES TO RELATED APPLICATIONS

The present application is related to a co-pending application entitled Method and System for Performance Reporting in a Network Environment, filed on even date herewith, assigned to the assignee of the present application, and herein incorporated by reference.

FIELD OF THE INVENTION

The present invention relates generally to information handling, and more particularly to methods and systems for evaluating the performance of information handling in a network environment.

BACKGROUND OF THE INVENTION

Various approaches have been proposed for monitoring, simulating, or testing web sites. Examples include U.S. Pat. No. 6,278,966 B1 (Howard, et al., Aug. 21, 2001), "Method and System for Emulating Web Site Traffic to Identify Web Site Usage Patterns." However, this example addresses substantially different problems (problems of simulation and hypothetical phenomena), and thus is significantly different from the present invention. Other examples include U.S. Pat. No. 6,078,956 (Bryant, et al., Jun. 20, 2000) and U.S. Pat. No. 5,787,254 (Maddalozzo, et al., Jul. 28, 1998). Other examples include services available from vendors such as Atesto Technologies Inc., Keynote Systems, and Mercury Interactive Corporation. These services may involve a script that runs on a probe computer. The examples mentioned above do not necessarily allow some useful comparisons.

A wide variety of valuable services are provided through client-server applications, so proper performance of client-server applications may be very important. Thus there is a need for systems and methods that evaluate the performance of client-server applications, including but not limited to web sites.

SUMMARY OF THE INVENTION

An example of a solution to problems mentioned above comprises providing a script; employing a plurality of probes, including at least one local probe and at least one remote probe; and measuring a client-server application's performance, with said probes, according to said script.

To give further examples of the solutions provided, there are solutions suitable for measuring any client-server application's performance. Also provided are solutions suitable for working applications that are actually providing services for users; the solutions do not depend upon mere simulations, and do not depend upon merely testing an application before it is put to work, for example. Also provided are solutions that allow comparing data from a local probe with data from a remote probe, for example.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

The examples that follow involve the use of one or more computers and one or more communications networks. The present invention is not limited as to the type of computer on which it runs, and not limited as to the type of network used.

The following are definitions of terms used in the description of the present invention and in the claims:

"Client-server application" means any application involving a client that utilizes a service, and a server that provides a service. Examples of such a service include but are not limited to: information services, transactional services, access to databases, and access to audio or video content.

"Comparing" means bringing together for the purpose of finding any likeness or difference, including a quantitative likeness or difference. "Comparing" may involve answering questions including but not limited to: "Is a measured response time greater than a threshold response time?" Or "Is a response time measured by a remote probe significantly greater than a response time measured by a local probe?"

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Measuring" means evaluating or quantifying.

"Performance" means execution or doing; "performance" may refer to any aspect of an application's operation, including availability, response time, time to complete batch processing or other aspects.

"Probe" means any computer used in evaluating, investigating, or quantifying performance; for example a "probe" may be a personal computer executing a script, acting as a client, and requesting services from a server.

"Response time" means elapsed time in responding to a request or signal.

"Script" means any program used in evaluating, investigating, or quantifying performance; for example a script may cause a computer to send requests or signals according to a transaction scenario. A script may be written in a scripting language such as Perl or some other programming language.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

Figure 1:
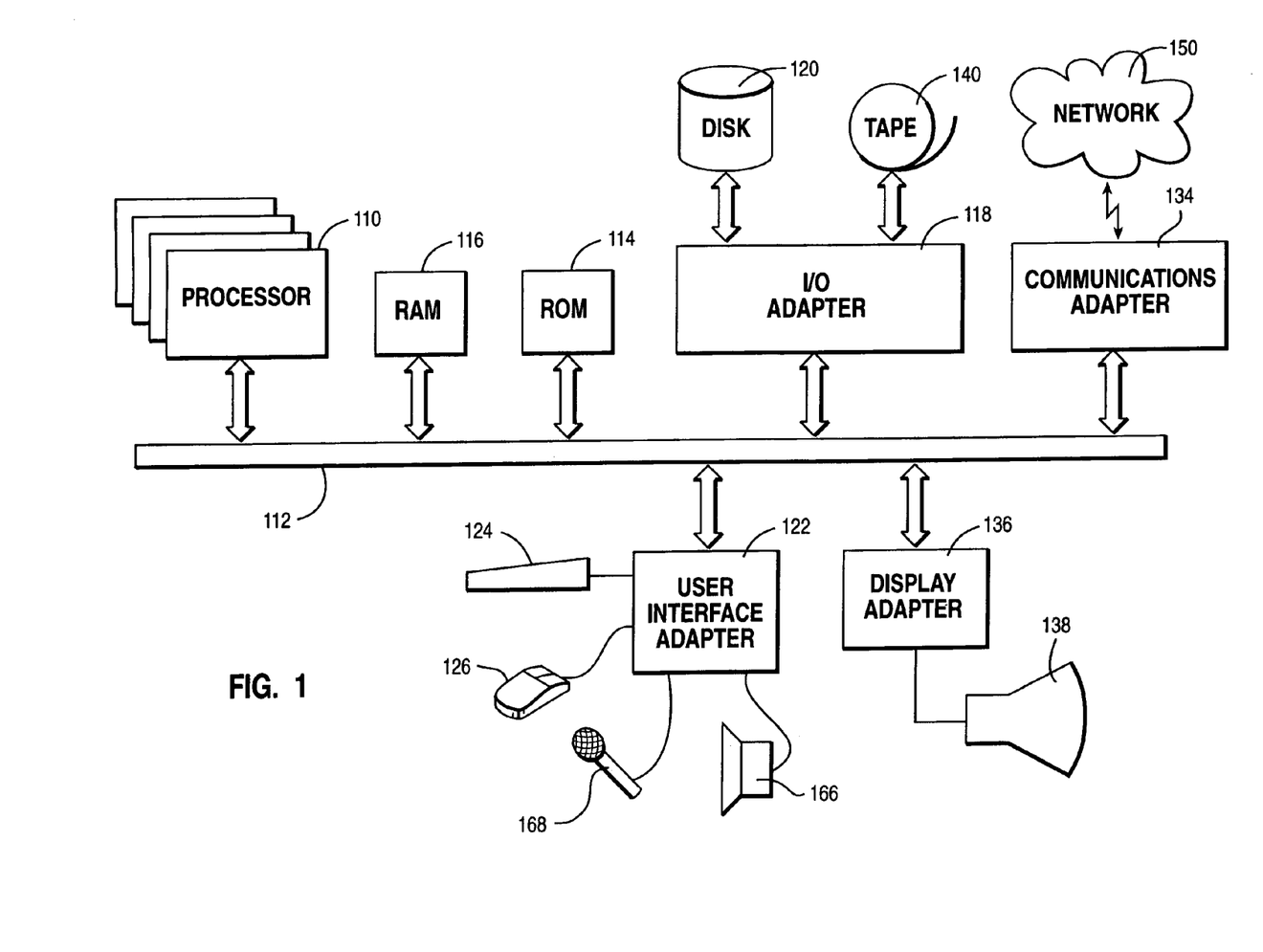
FIG. 1 illustrates a simplified example of a computer system capable of performing the present invention.

FIG. 1 illustrates a simplified example of an information handling system that may be used to practice the present invention. The invention may be implemented on a variety of hardware platforms, including embedded systems, personal computers, workstations, servers, and mainframes. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a data processing network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
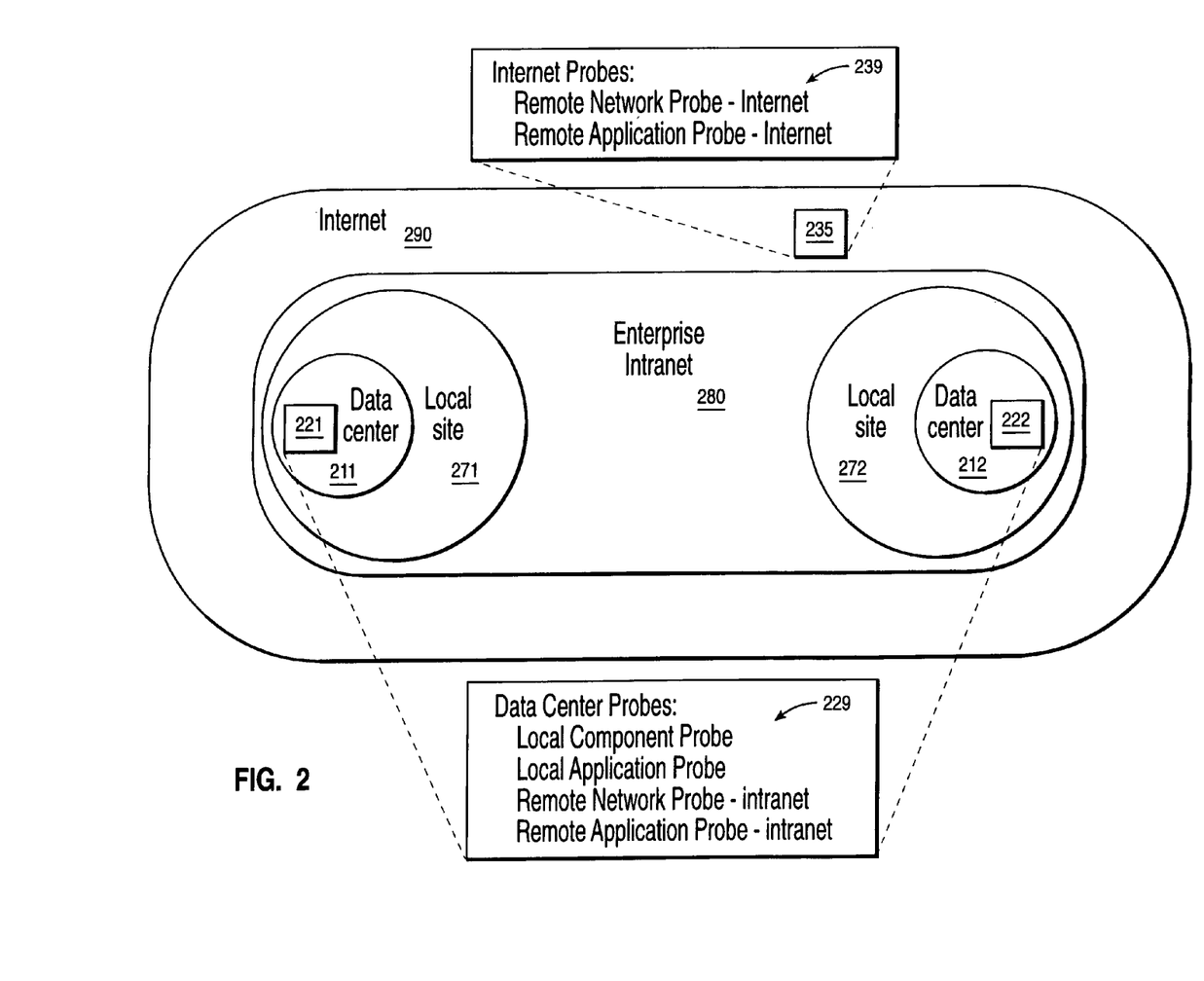
FIG. 2 is a high-level block diagram illustrating an example of a measurement architecture employing a plurality of probes, according to the teachings of the present invention.

FIG. 2 is a high-level block diagram illustrating an example of a measurement architecture employing a plurality of probes, according to the teachings of the present invention. The basic function of a probe is that it repeatedly executes a predefined scenario or script. As seen in FIG. 2, probes may be placed strategically in a hosting site or data center (at 211 or 212), at a local site outside the data center (at 271 or 272), on an enterprise network (intranet, at 280) or the Internet (at 290), depending on the measurements that they need to provide. The example involves placing at least one remote probe, shown at 235, on the Internet, shown at 290. The list at 239 has descriptions of different measurement techniques that may be implemented with one or more probes placed at 235. The Internet measurements may be provided by various companies in the marketplace which provide this kind of service, or may be obtained by other means.

The example also involves placing at least one probe, shown at 221 and 222, in at least one data center, shown at 211 and 212. The list at 229 has descriptions of different measurement techniques that may be implemented with one or more probes placed at 221 or 222.

FIG. 2 illustrates that employing a plurality of probes may comprise at least one of: employing a component probe; employing an application probe; and employing a network probe. Referring to the lists at 229 and 239:

Component Probes measure availability, utilization and performance of infrastructure components, including servers, LAN, and services. Local component probes (LCPs) are deployed locally in service delivery centers or data centers (at 211 or 212).

Network Probes measure network infrastructure response time and availability. Remote Network Probes (RNPs) will be deployed in data centers (at 211 or 212) if measuring the intranet or at Internet Service Provider (ISP) sites if measuring the Internet.

Application Probes measure availability and performance of applications and business processes.

Local Application Probe (LAP): Application probes deployed in a local hosting site or data center (at 211 or 212) are termed Local Application Probes.

Remote Application Probe (RAP): An application probe deployed from a remote location is termed a Remote Application Probe.

The concept of "probe" is a logical one. Thus, implementing a local component probe could actually consist of implementing multiple physical probes.

Figure 3:
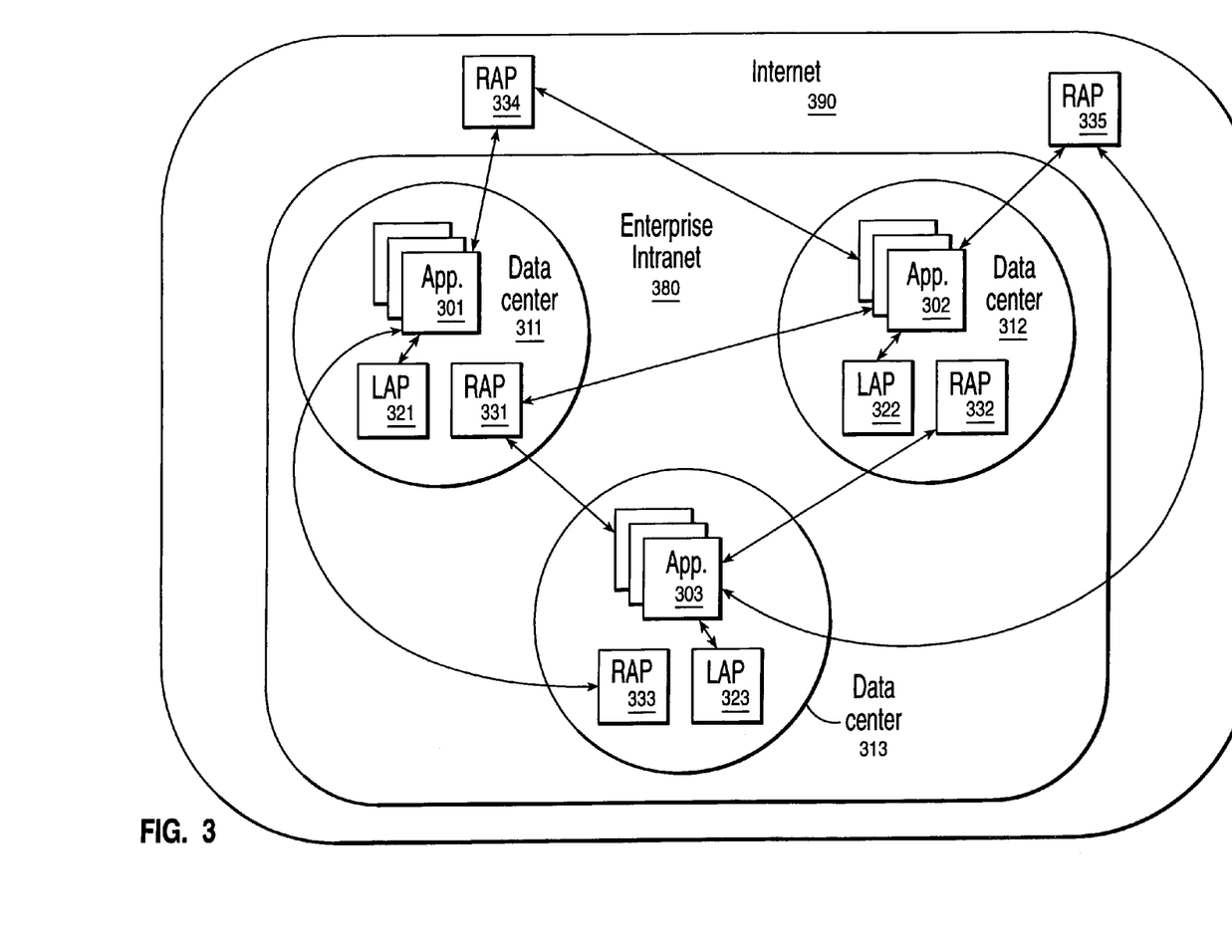
FIG. 3 is a block diagram illustrating an example of application measurement with the present invention.

FIG. 3 is a block diagram illustrating an example of application measurement with the present invention. This comprises: providing a script (not shown in this diagram); employing a plurality of probes, including at least one local probe (shown at 321, 322, and 323) and one remote probe (shown at 331, 332, 333, 334, and 335); measuring a client-server application's performance (applications shown at 301, 302, and 303) with said probes, according to said script; and collecting in a database data produced by said measuring (not shown in this diagram). Measuring a client-server application's performance comprises measuring response time for at least one request (the double-headed arrows connecting probes and applications symbolize requests and responses). Employing a plurality of probes may involve placing at least one remote probe (such as those shown at 331, 332, and 333) on an intranet (shown at 380), or placing at least one remote probe (such as those shown at 334 and 335) on the Internet (shown at 390).

For example, providing a script would comprise defining a set of transactions that are frequently performed by end users, and employing a plurality of probes would comprise placing at least one remote probe at each location having a relatively large population of end users. Note that the Remote Application Probe transactions and Local Application Probe transactions should be the same transactions. The model measures all the transactions locally, so that the local application response time can be compared to the remote application response time. This can provide insight to key application performance issues. End-to-end measurement of an organization's internal applications for internal customers will involve a RAP on the intranet, whereas end-to-end measurement of an organization's external applications for customers, business partners, suppliers, etc. will involve a RAP on the Internet. The model involves defining a representative transaction set, and deploying remote application probes at all relevant end-user locations. (This simplicity is something that can only be appreciated when this architecture is contrasted with other more complicated models.) A benefit following from the simplicity of this model is that it is easily generalized to other environments besides web based applications.

Figure 4:
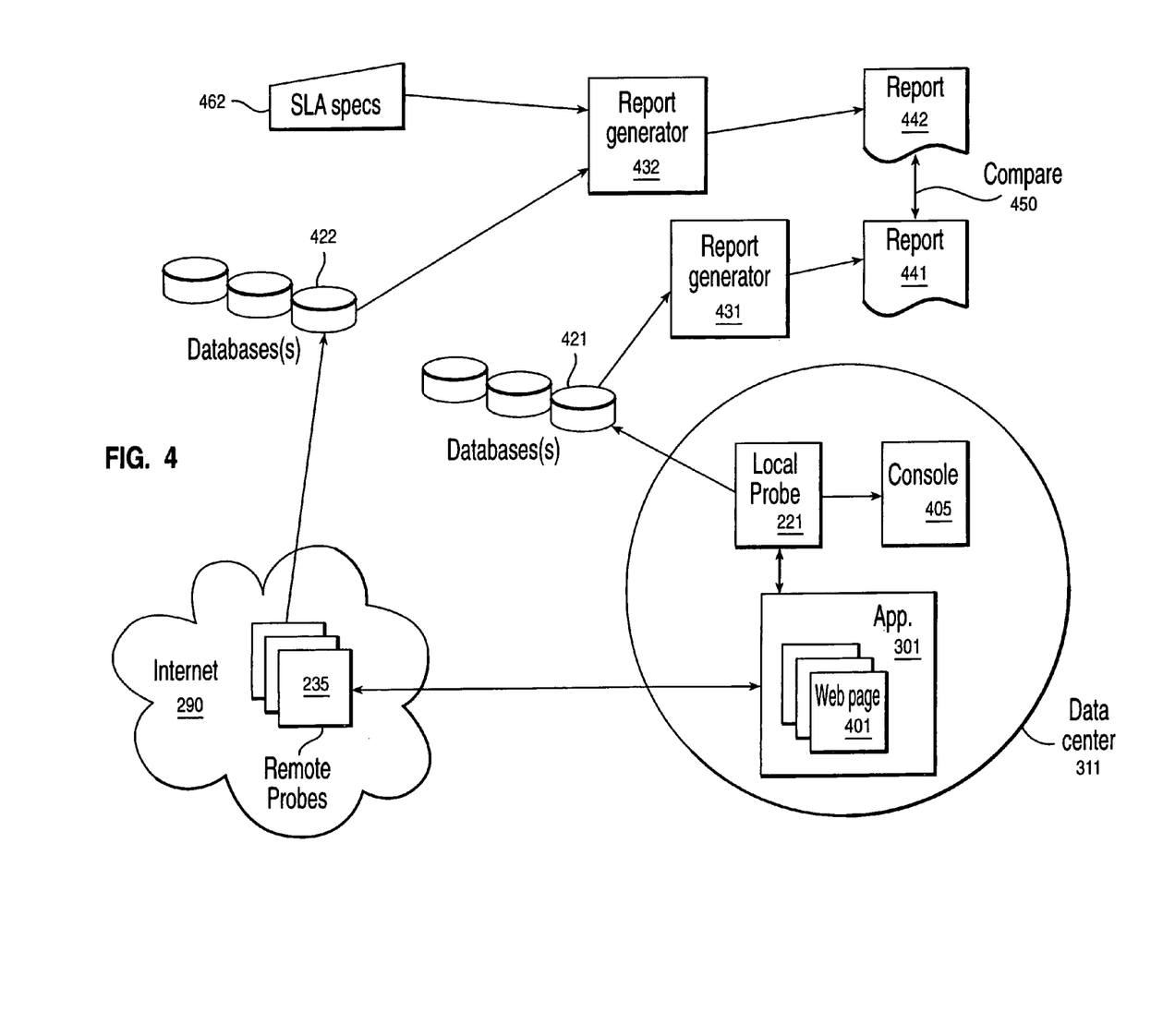
FIG. 4 is a block diagram illustrating one example of how the present invention was implemented for web site measurement.

FIG. 4 is a block diagram illustrating one example of how the present invention was implemented for web site measurement. As an overview, this implementation comprised: providing a script (not shown here); obtaining at least one local probe measurement (local probe shown at 221) of a client-server application's performance (application shown at 301), according to said script; obtaining at least one remote probe measurement (remote probes shown at 235) of said client-server application 301's performance, according to said script; comparing at least one of said measurements (stored in database 422) with at least one threshold value (deriving said at least one threshold value from a service level agreement [SLA] shown at 462); and reporting results (for example, report 442) of said comparing.

Turning now to some details of the example implementation, obtaining at least one remote probe measurement (remote probes shown at 235) comprised measuring response time for a request (the double-headed arrow connecting remote probes at 235 with application 301 symbolizes requests and responses). Obtaining at least one local probe measurement (local probe shown at 221) comprised measuring response time for said request (the double-headed arrow connecting local probe 221 with application 301 symbolizes requests and responses). The example implementation involved comparing at least one local probe measurement (in report 441 for example) with at least one remote probe measurement (in report 442 for example). The double-headed arrow at 450 symbolizes comparison.

Turning now to further details of the example implementation, we located application probes locally at hosting sites (local probe shown at 221, within data center 311) and remotely at relevant end-user sites (remote probes at 235). This not only exercised the application code and application hosting site infrastructure, but also probed the ability of the application and network to deliver data from the application hosting site to the remote end-user sites. End-to-end measurement of IBM external applications (symbolized by application 301 with web pages 401) for customers or business partners, for example, involved RAP's on the Internet (remote probes at 235 shown within Internet 290). While we measured the user availability and performance from a customer perspective (remote probes at 235), we also measured the availability and performance of the application at the location where it was deployed (local probe shown at 221, within data center 311). This provided baseline performance measurement data, that could be used for analyzing the performance measurements from the remote probes (at 235).

Local probe 221 was implemented with a personal computer, utilizing IBM's Enterprise Probe Platform technology, but other kinds of hardware and software could be used. A local probe 221 was placed on the IBM network just outside the firewall at the center where the web site was hosted. A local probe 221 was used to probe one specific site per probe. There could be multiple scripts per site. A local probe 221 executed the script every 20 minutes. Intervals of other lengths also could be used. If a local probe 221 encountered a problem (e.g. it was unable to access the site or unable to complete the script) on two consecutive executions of the script, local probe 221 generated a real time alert (problem event), and sent it to a TIVOLI management system (shown as console 405). Another similar kind of management system could be used. An alert message via email also could be used.

Local probe 221 sent to a database 421 the data produced by the measuring process. Database 421 was implemented by using IBM's DB2 technology, but other database management software could be used, such as ORACLE, INFORMIX, SYBASE, MYSQL, Microsoft Corporation's SQL SERVER, or similar software. For local probe data, an automated reporting tool (shown as report generator 431) ran continuously at set intervals, obtained data from database 421, and sent reports 441 via email to these IBM entities: the web site owner, the hosting center, and IBM's world wide command center. Reports 441 also could be posted on a web site at the set intervals. Report generator 431 was implemented by using the Perl scripting language and the AIX operating system. However, some other programming language could be used, and another operating system could be used, such as LINUX, or another form of UNIX, or some version of Microsoft Corporation's WINDOWS, or some other operating system.

Remote probes at 235 were implemented by contracting for probing services available from Mercury Interactive Corporation, but services from another vendor could be used, or remote probes could be implemented by other means (e.g. directly placing probes at various ISP's). A remote probe 235 may be used to probe one specific site per probe; a probe also has the capability of probing multiple sites. There could be multiple scripts per site. Remote probes 235 were located at various ISP's in parts of the world that the web site supported. A remote probe 235 executed the script every 60 minutes. Intervals of other lengths also could be used. If multiple remote probes at 235 are used, probe execution times may be staggered over the hour to ensure that the performance of the web site is being measured throughout the hour. Remote probes at 235 sent to a database 422 the data produced by the measuring process. Database 422 was implemented by using Mercury Interactive's database, but other database management software could be used, such as IBM's DB2, ORACLE, INFORMIX, SYBASE, MYSQL, Microsoft Corporation's SQL SERVER, or similar software. Report generator 432 was implemented by using Mercury Interactive's software and web site, but another automated reporting tool could be used, such as the one described above for local probe data (shown as report generator 431). IBM's arrangement with Mercury Interactive included the following: Mercury Interactive's software at 432 used IBM's specifications (symbolized by "SLA specs" at 462) and created near-real-time reports (symbolized by report 442) in a format required by IBM; IBM's specifications and format were protected by a confidential disclosure agreement; the reports at 442 were supplied in a secure manner via Mercury Interactive's web site at 432; access to the reports was restricted to IBM entities (the web site owner, the hosting center, and IBM's world wide command center).

Figure 5:
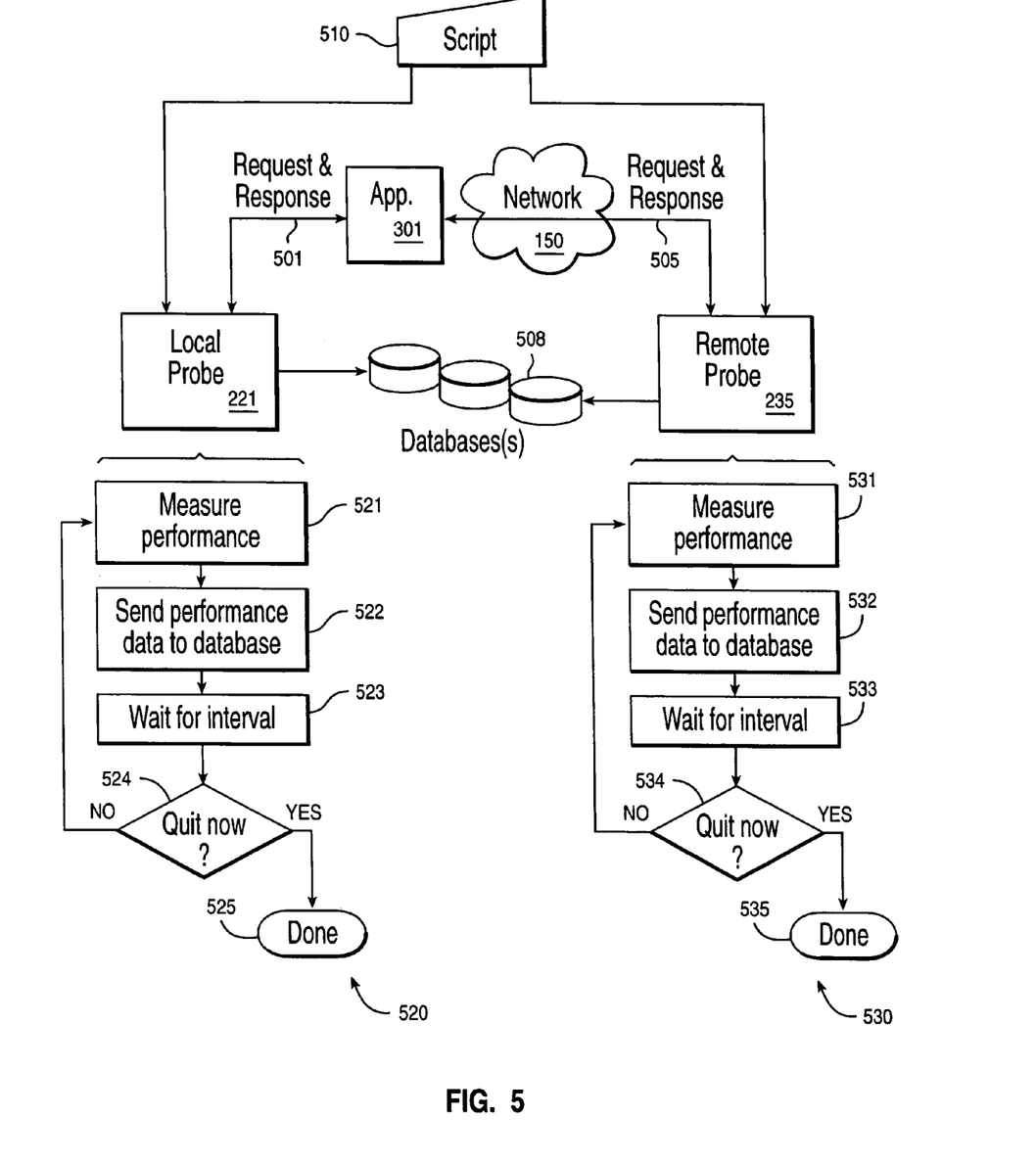
FIG. 5 is a diagram with flow charts illustrating selected features that may be included in an example of the present invention.

FIG. 5 is a diagram with flow charts illustrating selected features that may be included in an example of the present invention. As an overview, this example comprises: providing a script (shown at 510); employing a plurality of probes, including at least one local probe (shown at 221) and at least one remote probe (shown at 235); providing an iterative process including a–d below:

a. measuring (shown at 521 and 531) a client-server application's performance (application shown at 301) according to said script 510;
b. sending (shown at 522 and 532) to a database (shown at 508) data produced by said measuring;
c. waiting for a set interval (shown at 523 and 533);
d. repeating (shown at 524 and 534) the above three steps until said iterative process is terminated;

with said at least one local probe 221, executing said iterative process (shown at 520); and with said at least one remote probe 235, executing said iterative process (shown at 530).

Turning now to some details of the example shown in FIG. 5, application 301 may be any client-server application. Some examples are a web site, a web application, database management software, a customer relationship management system, an enterprise resource planning system, or an opportunity-management business process where a client directly connects to a server.

Providing a script 510 may comprise defining a set of transactions that are frequently performed by end users. Providing a script 510 may involve decomposing an actual business process. The business process may for example: represent the most common tasks performed by the end users, exercise major components of the applications, cover multiple hosting sites, cross multiple applications, or involve specific infrastructure components that should be monitored on a component level. Using script 510, local and remote application probes may measure the end-to-end user experience for repeatable transactions, either simple or complex. End-to-end measurements focus on measuring the business process (as defined by a repeatable sequence of events) from the end user's perspective. End-to-end measurements tend to cross multiple applications, services, and infrastructure. Examples would include: create an order, query an order, etc.

Measuring (521 and 531) a client-server application's performance typically would comprise measuring response time for at least one request. The double-headed arrow 501 connecting local probe 221 with application 301 symbolizes requests and responses. The double-headed arrow 505 connecting remote probe 235 with application 301 symbolizes requests and responses, sent via network 150. Requests are contained in script 510 that runs on local probe 221 and remote probe 235. Employing a plurality of probes may comprise placing at least one remote probe on an intranet, or placing at least one remote probe on the Internet.

Some possible ways to implement local probe 221, remote probe 235, and one or more databases at 508 are described above regarding FIG. 4. Ways to implement a script that runs on a probe are well-known; vendors provide various services that involve a script that runs on a probe.

In conclusion, we have shown examples of methods and systems for probing client-server applications in a network environment.

One of the possible implementations of the invention is an application, namely a set of instructions (program code) in a code module which may, for example, be resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the required method steps.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:

1. A method for probing services in a network environment said method comprising:
   providing a script;
   providing a remote probe configured to measure a first set of performance data associated with a client device, wherein the performance data is data related to an interaction of the client device with a server device;
   providing a local probe configured to measure a second set of performance data associated with a server application on the server device with which the client device interacts, wherein the second set of performance data is data related to an interaction of the server application with the client device;
   measuring a client-server application's performance, with said local and remote probes, according to said script, to thereby generate the first set of performance data and the second set of performance data; and
   collecting, in a database, the first and second sets of performance data produced by said measuring.

2. The method of claim 1, further comprising:
   comparing at least one value, obtained by said measuring, with at least one threshold value.

3. The method of claim 2, further comprising:
   reporting results of said comparing.

4. The method of claim 2, wherein said comparing further comprises:
   utilizing said at least one threshold value derived from a service level agreement.

5. The method of claim 1, further comprising:
   comparing data from said local probe with data from said remote probe.

6. The method of claim 1, wherein said measuring further comprises:
   measuring availability.

7. The method of claim 1, wherein said measuring further comprises:
   measuring response time for at least one request.

8. The method of claim 1, wherein:
   said providing a script further comprises defining a set of transactions that are frequently performed by end users; and
   said employing further comprises placing at least one remote probe at each location having a relatively large population of end users.

9. The method of claim 1, wherein said local probe is one of:
   a component probe;
   an application probe; or
   a network probe.

10. The method of claim 1, wherein said local probe and said remote probe measure response time to requests generated by said script, and wherein the method further comprises:
    comparing a first response time measured by said local probe to a second response time measured by said remote probe.

11. The method of claim 1, wherein measuring a client-server application's performance, with said local and remote probes, according to said script, to thereby generate said first set of performance data and said second set of performance data comprises performing a plurality of transactions with a plurality of different servers and measuring performance characteristics with regard to each transaction and each server using said remote probe, and obtaining performance data from each of a plurality of local probes associated with each server.

12. A method for probing services in a network environment, said method comprising:
   providing a script;
   providing a remote probe configured to measure a first set of performance data associated with a client device, wherein the performance data is data related to an interaction of the client device with a server device;
   providing a local probe configured to measure a second set of performance data associated with a server application on the server device with which the client device interacts, wherein the second set of performance data is data related to an interaction of the server application with the client device;
   providing an iterative process for each of the remote probe and local probe, including a–d below:
      a. measuring a client-server application's performance according to said script;
      b. sending to a database data produced by said measuring;
      c. waiting for a set interval;
      d. repeating the above three steps until said iterative process is terminated;
   with said at least one local probe, executing said iterative process; and
   with said at least one remote probe, executing said iterative process.

13. The method of claim 12, further comprising:
   comparing at least one value obtained by said measuring with at least one threshold value.

14. The method of claim 12, further comprising:
   comparing data from said local probe with data from said remote probe.

15. The method of claim 12, wherein said measuring further comprises:
   measuring response time for at least one request.

16. The method of claim 12, wherein:
   said providing a script further comprises defining a set of transactions that are frequently performed by end users; and
   said employing further comprises placing at least one remote probe at each location having a relatively large population of end users.

17. The method of claim 12, wherein said local probe is one of:
   a component probe;
   an application probe; or
   a network probe.

18. The method of claim 12, wherein said local probe and said remote probe measure response time to requests generated by said script, and wherein measuring a client-server application's performance according to said script further comprises:
   comparing a first response time measured by said local probe to a second response time measured by said remote probe.

19. The method of claim 12, wherein measuring a client-server application's performance according to said script comprises performing a plurality of transactions with a plurality of different servers and measuring performance characteristics with regard to each transaction and each server using said remote probe, and obtaining performance data from each of a plurality of local probes associated with each server.

20. A method for probing services in a network environment, said method comprising:
   providing a script;
   providing a remote probe configured to measure a first set of performance data associated with a client device, wherein the performance data is data related to an interaction of the client device with a server device;
   providing a local probe configured to measure a second set of performance data associated with a server application on the server device with which the client device interacts, wherein the second set of performance data is data related to an interaction of the server application with the client device;
   obtaining at least one local probe measurement of a client-server application's performance, according to said script;
   obtaining at least one remote probe measurement of said client-server application's performance, according to said script;
   comparing at least one of said measurements with at least one threshold value; and
   reporting results of said comparing.

21. The method of claim 20, wherein said comparing further comprises:
   deriving said at least one threshold value from a service level agreement.

22. The method of claim 20, wherein:
   said obtaining at least one remote probe measurement further comprises measuring response time for a request; and
   said obtaining at least one local probe measurement further comprises measuring response time for said request.

23. The method of claim 22, further comprising:
   comparing said at least one local probe measurement with said at least one remote probe measurement.

24. The method of claim 20, wherein said local probe is one of:
   a component probe;
   an application probe; or
   a network probe.

25. A system for probing services in a network environment, said system comprising:
   a script;
   a remote probe configured to measure a first set of performance data associated with a client device, wherein the performance data is data related to an interaction of the client device with a server device;
   a local probe configured to measure a second set of performance data associated with a server application on the server device with which the client device interacts, wherein the second set of performance data is data related to an interaction of the server application with the client device;
   means for measuring a client-server application's performance, with said local and remote probes, according to said script, to thereby generate the first set of performance data and the second set of performance data; and
   means for collecting, in a database, the first and second sets of performance data produced by said measuring.

26. The system of claim 25, further comprising:
   means for comparing at least one value, obtained by said means for measuring, with at least one threshold value.

27. The system of claim 26, further comprising:
   means for reporting results of said comparing.

28. The system of claim 26, wherein said means for comparing further comprises:

means for utilizing said at least one threshold value derived from a service level agreement.

29. The system of claim 25, further comprising:

means for comparing data from said local probe with data from said remote probe.

30. The system of claim 25, wherein said means for measuring further comprises:

means for measuring availability.

31. The system of claim 25, wherein means for measuring further comprises:

means for measuring response time for at least one request.

32. The system of claim 25, wherein:

said script further comprises a set of transactions that are frequently performed by end users; and said plurality of probes further comprises at least one remote probe placed at each location having a relatively large population of end users.

33. The system of claim 25, wherein said local probe further comprises at least one of:

a component probe;

an application probe; or a network probe.

34. The system of claim 25, wherein said local probe and said remote probe measure response time to requests generated by said script, and wherein said system further comprises:

means for comparing a first response time measured by said local probe to a second response time measured by said remote probe.

35. The system of claim 25, wherein said means for measuring a client-server application's performance, with said local and remote probes, according to said script, to thereby generate said first set of performance data and said second set of performance data comprises:

means for performing a plurality of transactions with a plurality of different servers;

means for measuring performance characteristics with regard to each transaction and each server using said remote probe; and means for obtaining performance data from each of a plurality of local probes associated with each server.

36. A computer-usable medium having computer-executable instructions for probing services in a network environment, said computer-executable instructions comprising:

a script;

means for providing a remote probe configured to measure a first set of performance data associated with a client device, wherein the performance data is data related to an interaction of the client device with a server device;

means for providing a local probe configured to measure a second set of performance data associated with a server application on the server device with which the client device interacts, wherein the second set of performance data is data related to an interaction of the server application with the client device;

means for measuring a client-server application's performance, with said local and remote probes, according to said script; and means for collecting, in a database, the first and second sets of performance data produced by said measuring.

37. The computer-usable medium of claim 36, further comprising:

means for comparing at least one value, obtained by said means for measuring, with at least one threshold value.

38. The computer-usable medium of claim 37, further comprising:

means for reporting results of said comparing.

39. The computer-usable medium of claim 37, wherein said means for comparing further comprises:

means for utilizing said at least one threshold value derived from a service level agreement.

40. The computer-usable medium of claim 36, further comprising:

means for comparing data from said local probe with data from said remote probe.

41. The computer-usable medium of claim 36, wherein said means for measuring further comprises:

means for measuring availability.

42. The computer-usable medium of claim 36, wherein said means for measuring further comprises:

means for measuring response time for at least one request.

43. The computer-usable medium of claim 36, wherein:

said script further comprises a set of transactions that are frequently performed by end users; and said means for employing a plurality of probes further comprises means for employing at least one remote probe placed at each location having a relatively large population of end users.

44. The computer-usable medium of claim 36, wherein said means for providing a local probe further comprises at least one of:

means for employing a component probe;

means for employing an application probe; or means for employing a network probe.

45. The computer-usable medium of claim 36, wherein said local probe and said remote probe measure response time to requests generated by said script, and wherein said computer-usable medium further comprises:

means for comparing a first response time measured by said local probe to a second response time measured by said remote probe.

46. The computer-usable medium of claim 36, wherein said means for measuring a client-server application's performance, with said local and remote probes, according to said script, to thereby generate said first set of performance data and said second set of performance data comprises:

means for performing a plurality of transactions with a plurality of different servers;

means for measuring performance characteristics with regard to each transaction and each server using said remote probe; and means for obtaining performance data from each of a plurality of local probes associated with each server.

* * * * *